Figure 1:
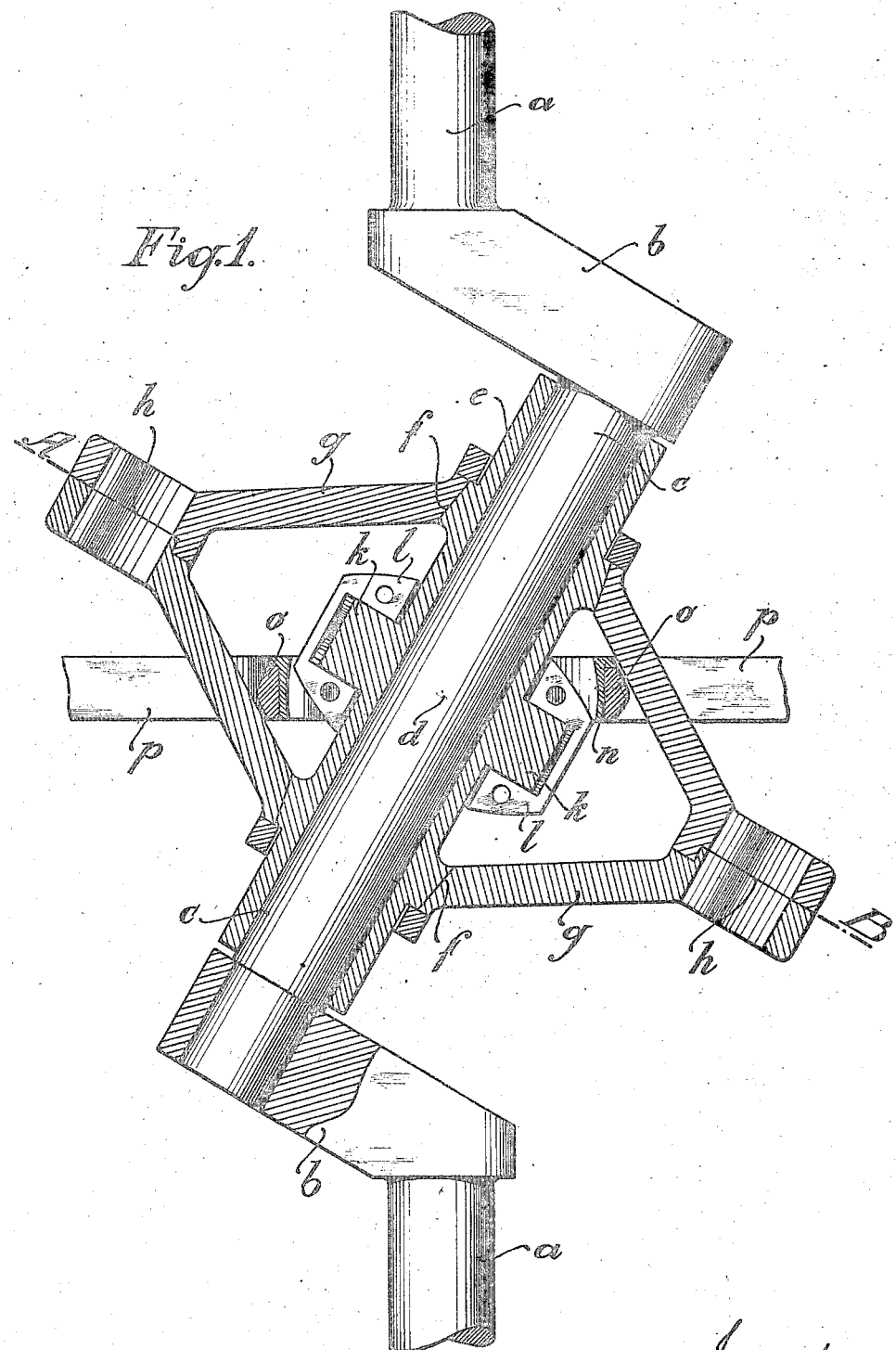

May 5, 1925.

H. C. OLIVIER 1,536,262

PISTON ENGINE

Filed May 28, 1921

2 Sheets-Sheet 2

Inventor.
Herman C. Olivier,
By Watson, Cox, Morse & Grindle,
Attorneys.

Patented May 5, 1925.

1,536,262

UNITED STATES PATENT OFFICE.

HERMAN COENRAAD OLIVIER, OF THE HAGUE, NETHERLANDS.

PISTON ENGINE.

Application filed May 28, 1921. Serial No. 473,440.

*To all whom it may concern:*

Be it known that I, HERMAN COENRAAD OLIVIER, a subject of the Queen of Holland, residing at The Hague, Netherlands, have invented certain new and useful Improvements in Piston Engines, of which the following is a specification.

My present invention relates to engines wherein a plurality of cylinders are arranged in parallel or substantially parallel relation around the crank shaft, and wherein the pistons act through rods on the periphery of a swivel piece which by its biconical motion imparts rotary motion to the shaft. The swivel piece in these machines may not as a matter of course revolve, but it must, notwithstanding its particular movement, be so mounted in relation to the engine frame that the points wherein it engages the piston rods remain substantially in the direction of motion of the pistons. Moreover, it is desirable that the thrust of the pistons is not transmitted to the crank shaft but taken up by the frame through another medium.

To meet these conditions it has already been proposed to connect the swivel piece with the frame through a universal joint arranged intermediate between the bearings of said piece so as to engage the latter through two trunnions and the frame through the other two.

In accordance with my present invention the swivel piece is likewise suspended by a universal joint adapted to prevent its rotation, however, the two trunnions which follow the movement of the swivel piece do not engage said piece directly but through a centrally arranged element, for instance, a sleeve or a rod. When said central element is made as a sleeve, it forms so to say a connection between the two bearings and is therefore preferably united with same to form a bearing throughout the whole length. If the central element is in the form of a rod it is pivoted in the crank webs, when the universal joint not only prevents rotary motion of the swivel piece but also distortion of the crank webs with respect to one another. In the first-named embodiment distortion of the crank webs is avoided by the crank pin by which the webs are rigidly connected; in this case, however, it is desirable to provide for some axial clearance in the bearings of the trunnions of the universal joint to prevent jamming which could occur when the construction is not theoretically exact because in such case it is required for four axes to intersect in one point. The central element in the form of a rod may itself have some axial clearance in its bearings in the crank webs.

The provision of the universal joint on the central element of the swivel piece results in a very compact construction which favorably affects the dimensions of all other parts.

Figure 2:
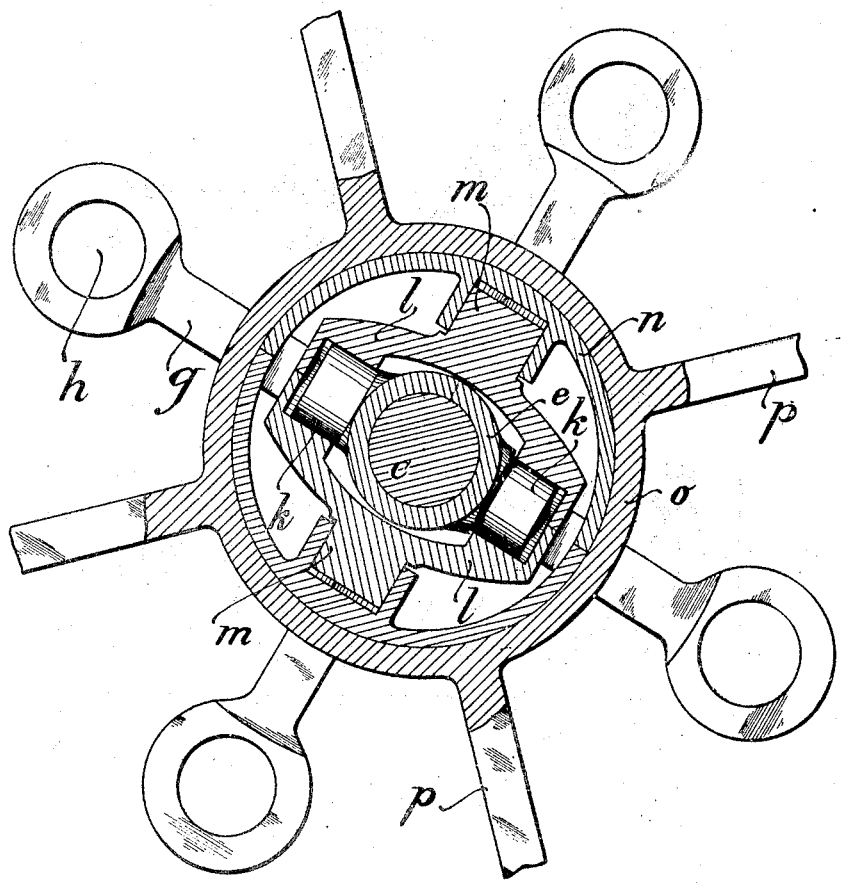

The annexed drawing illustrates by way of example only a practical embodiment of the invention, Fig. 1 showing a section through the crank pin and Fig. 2 a section along the line A—B in Fig. 1.

The crank shaft $a$ is provided with the crank webs $b$ pointing in opposite directions and rigidly connected by the crank pin $c$. The axes of the crank pin and of the crank shaft intersect in $d$, in which point also intersect the axes of the trunnions of the universal joint.

The crank pin $c$ is enclosed throughout its length by a sleeve $e$ having conical faces $f$ upon which is mounted the swivel piece $g$. Said swivel piece is composed of two sets each comprising four radial arms meeting in pairs in the points $h$, which are the points wherein the four connecting rods are engaged.

Integral with the sleeve $e$ are the trunnions $k$ of the universal joint, said trunnions being supported in bearings of a gimbal piece $l$, composed of two parts each integral with a trunnion $m$. The trunnions $m$ are supported in bearings of a ring $n$ which is also of bi-part formation and mounted in the engine frame through a ring $o$ and arms $p$.

The trunnions $k$ and $m$ have some axial clearance in their bearings in order that the universal joint may so adjust itself that the intersection of the axes of the trunnions coincide with that of the axes of crank pin and crank shaft.

It will be understood that the engine may be used as a prime mover but also as a power consuming engine.

The swivel piece may be formed as a spider as shown or a casing of a different shape; such casing should of course be provided with holes for the passage of arms $p$.

It is not necessary for the joint to be a universal joint having two pairs of trunnions. It may have any suitable form provided only that it takes up the thrust of the swivel piece and prevents the same from rotating; said joint is especially suitable for the admission of lubricant, also for the bearings of the crank shaft.

What I claim and desire to secure by Letters Patent is:—

A device of the class described, including in combination a frame, a shaft adapted to gyrate about a fixed point, a sleeve mounted for rotation on said shaft, a wobbler secured to said sleeve and provided with slots for the passage of said frame, axially aligned trunnions extending laterally from said sleeve, and a gimbal piece within said wobbler, pivotally secured to said frame and having recesses to receive said trunnions.

In testimony whereof I affix my signature.

HERMAN COENRAAD OLIVIER.